United States Patent Office 3,351,546
Patented Nov. 7, 1967

3,351,546
HIGH YIELD ELECTROLYTIC FUSION CELL HAVING ANODE SUSPENSION MEANS
Jacques Chambran, Tarascon-sur-Ariege, Robert M. G. J. Scalliet, St.-Jean-de-Maurienne, and Daniel Duclaux, Lille, France, assignors to Pechiney, Compagnie de Produits Chimiques et Electrometallurgiques, Paris, France
Filed Oct. 11, 1963, Ser. No. 315,648
Claims priority, application France, Oct. 19, 1962, 912,817
10 Claims. (Cl. 204—243)

ABSTRACT OF THE DISCLOSURE

An electrolytic fusion cell having a device for suspending the anodes including a horizontally disposed fixed frame and a horizontally disposed movable frame in spaced relationship thereto. Clamp means are associated with the respective frames for holding a plurality of anodes. The clamp means can be selectively released whereby relative movements of frames will result in shifting of the positions of the anodes relative to the frames. The clamp means provide electrical connecting means between the anodes and conductive bars associated with the frames.

The cell includes an insulated hood structure defining a heat reflecting interior surface. The side walls of the hood structure can be opened to provide access to the interior of the cell.

---

The present invention concerns a novel device for suspending the preheated anodes of an electrolytic fusion cell and for covering the cell. More particularly, the invention relates to cells for producing aluminum by electrolysis of alumina, although it is not restricted to this particular use.

It is well known that an electrolytic cell comprises:
(a) A heat-insulated metallic or non-metallic tank externally defining the space within which electrolysis takes place;
(b) A cathode, usually made of carbon and fixed in the base of the tank by an operation known as "brasquage," this word also being applied to the assembly formed by the cathode and its accessories, the latter being adapted particularly to give the cathodic surface a perfectly impervious upper surface;
(c) An anode system comprising at least one anode made from a material with a carbon base, of which the lower surface is known as the "anodic plane." The anodes are fixed to a suspension device comprising a mechanism for lowering the anodes in such a way that the distance between the anode and the metal is kept constant in spite of the erosion of the anodes. In the case of electrolytic baths with pre-heated anodes, the anodes are generally equipped with an anode rod connected to the suspension mechanism;
(d) A system of conductors supplying electrical energy to the bath. As the cells normally operate with very large currents, of the order of from 20 to over 100 kilo-amperes, and at low voltage, of the order of 4 or 5 volts, they are grouped in series so as to form sets known as "series" which are fed with a more easily supplied voltage. The fact that conductors with such large currents passing through them are present in the vicinity of the baths gives rise to magnetic fields which exert forces on the metal deposited on the cathode, such as to cause agitation prejudicial to the yield from the current.
(e) A system for capturing the gases produced by electrolysis. In practical installations this system is often omitted and, when it is provided, it acts on the whole atmosphere of the electrolytic workshop, into which the gases produced escape freely.

In the case of the production of aluminum, the electrolytic bath is made up of alumina dissolved in a mixture of aluminum fluoride and sodium fluoride in a proportion substantially corresponding to that of cryolite, with a surplus of ammonium fluoride or other salts containing fluorine in small quantities. The aluminum is deposited on the cathode, i.e. at the bottom of the bath, and oxygen is freed at the anode and combines with the carbon of the latter to form carbon dioxide and carbon monoxide. The temperature of the bath is normally about 950° C. It has been recognized that too high a temperature is detrimental to the yield from the current and increases the consumption of the anode while too low a temperature reduces the solubility of the alumina in the bath.

In normal operation only the alumina is decomposed and the cryolite, which acts as a solvent, is not used up. However, when the alumina content drops below about one percent, polarization takes place, and a gaseous sheath is formed which hinders the passage of the current and causes the electrical resistance to increase. The voltage at the terminals of the bath then rises to between 20 and 70 volts, this effect being known as the "anodic effect." This is commonly referred to in practice by saying that the bath "becomes packed." In order to stop this effect, some alumina has to be re-dissolved, in small quantities in order to diminish deposition at the bottom of the bath. This operation of stopping the anodic effect is similarly referred to in practice as "unpacking" the bath.

The anodic effect is very troublesome since it causes a great deal of gas to be released following the volatilization of the fluorine containing products which occurs due to the rise in temperature. This rise in temperature reduces the yield from the operation and accelerates the consumption of the anodes by oxy-reactants and carboxy-reactants. On the other hand, the voltage rise due to the packing process represents a loss of energy. For a given interpolar distance the current density, i.e. the ratio of the current strength to the cross section of flow in the various conductors to the anode (total surface of the lower faces of the anodes forming the anodic plane), bath and cathode, must be such that losses incurred throughout by the Joule effect are equal to the total amount of heat yielded by the bath to the external surroundings at a bath temperature of about 950° C.

One part of the electrical energy supplied to the bath is in effect used up in the form of energy for the electrolysis proper and the rest in the form of heat. The latter can be divided into the energy required to bring the raw materials to the temperature of the bath, and heat losses.

Reduction of heat losses proper raises the price of the bath and consequently the capital investment necessary to produce the same quantity of aluminum, but reduces the amount of energy required to produce it. It follows that there is an economical density which is much lower than the densities found in electrolytic baths at present in use. In order to reach this density, the bath must therefore be heat-insulated to a considerable extent.

Heat schedules for baths with pre-heated anodes and with the cathode on the ground show that 60 to 70 percent of the heat losses take place at the top of the bath, where the mean temperature is from 100° to 200° C., the ambient air being heated on the one hand by convection from the alumina, the anodes and their rods, and on the other hand by radiation. The remaining 30 to 40 percent of heat losses take place by convection, from the tank and the ground bars.

The last mentioned losses can be reduced by increasing the thickness of the heat insulation in the tank or by reducing its heat conductivity. The first solution involves increasing the exchange surface with the ambient air and there is, thus, an economically desirable thickness for the heat insulation.

It has also been recognized that the top of the bath can be provided with a heat insulating hood. Heat insulating products at present on the market enable a cold surface of 30 to 40° C. to be obtained where the insulating material has a hot surface of 250° C., and is only a few centimeters thick. The minimum temperature drop at the upper exchange surface between the bath and the ambient air would thus be of the order of 60° C.

The existence of a hood however raises the problem of removing the gases produced by the reaction. Suction means must be provided to remove the gases, but their discharge capacity must be just sufficient to remove the gases discharged by the bath plus the leakage at the joints.

None of the hoods used hitherto has provided a satisfactory solution to the various problems raised by the maintenance requirements of the bath which include the following:

The need to inspect the bath while it is operating;
The need to change the anodes when they are used up;
The need to feed the liquor of the bath with alumina;
The need to cast the metal produced;
The need to capture the gases emitted, either while the bath is operating normally or at the time of the anodic effects;
The need to keep a constant distance between the anode and the surface of the metal, in spite of the consuming of the anodes.

These operations generally make it necessary to take off the whole hood, causing a great deal of heat to be lost, so that the hood loses much of its effectiveness. The second and fifth of the above requirements raise the most difficult problems since it is necessary to change an anode having a rod extending through a hood and it is necessary to collect the gases emitted during the packing without increasing the losses due to natural convection from the bath.

It is a general object of this invention to provide an apparatus for suspending the preheated anodes of a hooded electrolytic fusion bath whereby the above noted disadvantages can be avoided.

It is a more particular object of this invention to provide an apparatus of the type described which can be located outside the hood, which can be operated without opening the hood, which permits regular upward and downward movement of the anodic system, and which also enables the positioning of new anodes in a secure and accurate manner.

Another object of the present invention is the provision of a hooded electrolytic fusion cell with pre-heated anodes and including a suspension device whereby nearly all the economies in energy made possible by heat insulation and hooding can be exploited, and whereby the hooding is arranged so that the bath can be maintained easily and the accompanying heat losses can be kept small.

It is a further object of this invention to provide an apparatus capable of achieving the foregoing objects and also capable of evacuating the gases produced during electrolysis and as a result of the anodic effect with the minimum of heat loss.

These and other objects of this invention will appear hereinafter and for purposes of illustration, but not of limitation, specific embodiments of the invention are found in the accompanying drawings in which.

Figure 1:
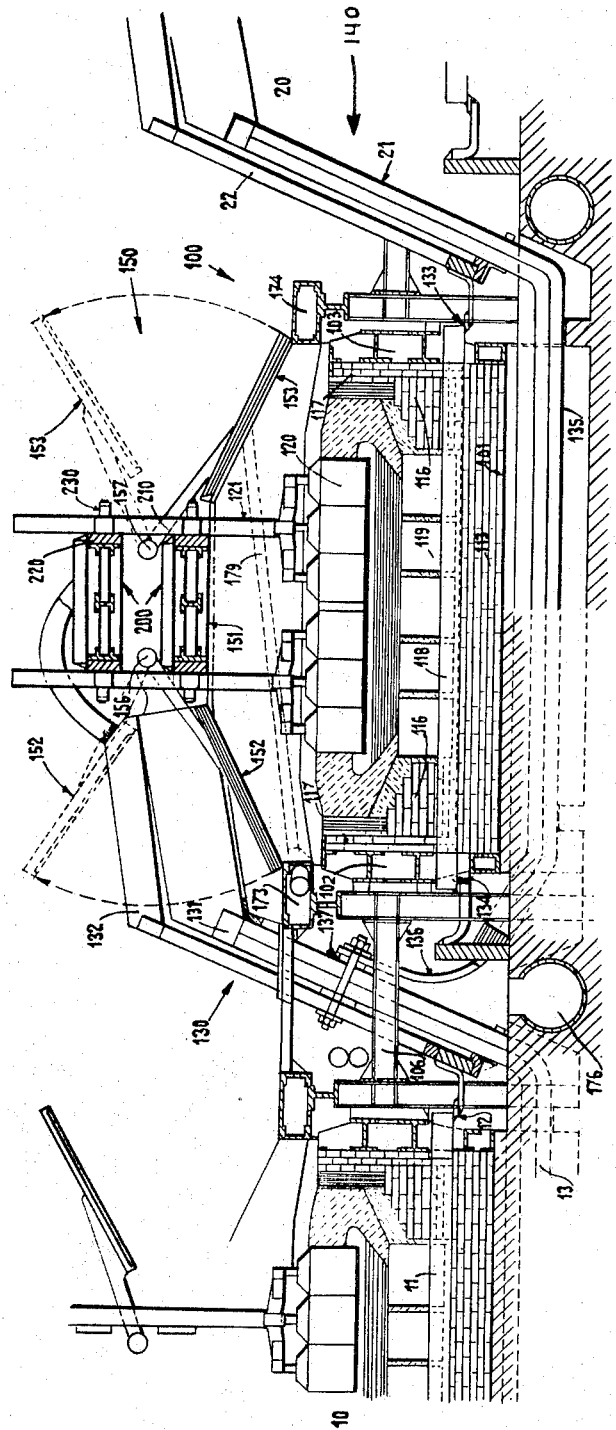
FIGURE 1 is a cross-sectional view of a cell characterized by the features of this invention.

The device for suspending the preheated anodes of an electrolytic bath according to the invention comprises, in combination:

A substantially horizontal fixed frame rigidly connected to but electrically insulated from the bath stand and carrying at least one electrically conductive horizontal bar. One face of this bar is in the form of a cylinder with a vertical generatrix which, in the commonest case of a rectangular bath, is reduced to two vertical parallel surfaces;

A substantially horizontal movable frame electrically connected to the fixed frame and carrying at least one electrically conductive horizontal bar, of which one face is associated with the vertical cylinder defined above;

A mechanism for imparting to the movable frame a vertical translatory movement relatively to the fixed frame. This may comprise a system of levers actuated by a motor through a device transforming its rotary movement into a translatory movement, for example a jack. Alternatively, a system of winches or a system of jacks or screw-nut units acting directly on the movable frame may be employed;

An assembly of clamps for suspending the anodes, each clamp comprising one of the four conductor bars of the corresponding frame and a gripping shoe acted on by a clamp girder with the aid of a compression spring calibrated to the desired tension, each anode rod being suspended by two clamps, one per frame;

A mechanism for acting on the clamp assembly, comprising a motor-reducer group acting on a vertical shaft equipped with cams, each cam acting on a roller fixed to one end of a clamp girder. The vertical shaft has two portions, each linked to a frame and each being adapted to slide relatively to the other. The cams of one of the frames are offset relatively to those of the other frame so that the anodes are blocked by at least one clamp in any position of the mechanisms.

The hooded electrolytic fusion cell with preheated anodes according to the invention, using the above suspension device, comprises, taken separately or in combination:

A bath sunk into the ground substantially to the level of the top edge of the tank and being substantially rectangular in plan and more particularly rectangular with the four corners cut-out. The ratio of the large side to the small side is preferably as near as possible to unity so as to increase natural heat insulation by reducing the perimeter for one and the same section. The base and the four side faces of the bath are covered with a layer of heat insulating material which is reinforced, particularly at the cut-out corners. The four side faces are buttressed at at least one point per face so as to avoid any deformation likely to destroy the heat insulation or "brasquage."

At least two "leads," i.e. groups of electric conductors, bringing current from the cathode of the preceding bath in this series to the anode of the bath in question. The first lead is located substantially one-quarter of the way along the large side, the other substantially three-quarters of the way along the same side faces. Each lead comprises at least two bars, one connected to the nearest end of the cathode of the preceding bath, the other extending from the remotest end of this cathode and passing below this bath. Each of these bars has the same resistance to currents of equal strength. The cathode of the bath in question likewise is connected to the anode of the following bath in the series thus avoiding any agitation of the metal by the action of magnetic fields on horizontal currents produced in the metal by the imbalance which would be created by incorrect distribution of the current;

A hood having a reflecting surface presented to the surface of the bath and having its other surface covered with at least one layer of heat insulating material;

A gas-capturing device comprising gas conduits incorporated in the members of the stand supporting the bath and in the flagstone floor surrounding the bath and terminating in a fan which in normal operation is capable of extracting slightly more than the total amount of the gas produced and the leakage of gas but adapted to dispose of the much larger amounts of gas produced for a brief period in the course of a packing-unpacking operation;

An anode assembly wherein the total surface of the anodic plane is such that the heat released by the passage of the electric current in the liquor is equal to the amount of heat lost, given an optimum temperature of the liquor, the total surface being, at equal intensity, greater than in conventional baths;

The above-mentioned device for suspending the anodes, wherein each frame is connected to one of the two "leads" for supplying current.

In a preferred embodiment of the invention the hood comprises a fixed horizontal and central portion above which the device for suspending the anode is positioned, and four inclined portions meeting the four sides of the central horizontal portion and the top edges of the four lateral walls of the bath, the four lateral portions each being rotatable about a horizontal shaft.

The cell illustrated is part of a series of prototype cells arranged "athwart," i.e. length against length, in order to reduce the heat losses still further, but the invention also covers cells arranged "lengthwise," i.e. width against width.

Figure 3:
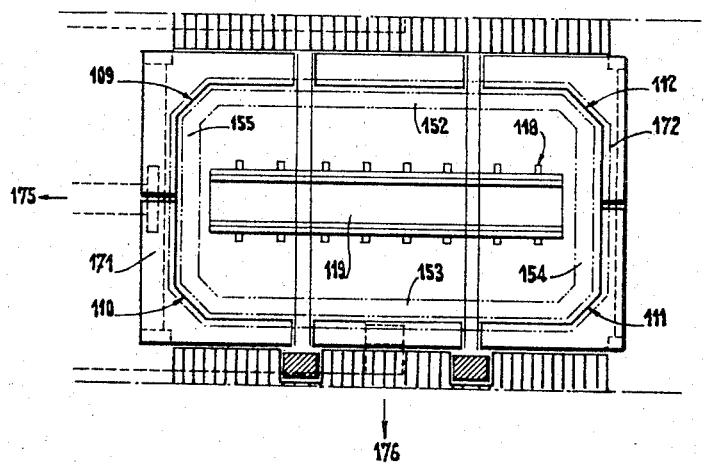
FIGURE 3 is a diagrammatic plan view illustrating the configuration of the cell.

The cell proper 100 is formed by a base 101 comprising a sheet of metal and by four vertical walls, of which two 102 and 103 extend lengthwise and two others 104 and 105 widthwise. Buttresses prevent any deformation of the frame. In the case shown in the figures, each long wall has two buttresses such as 106 and each short wall one buttress, 107 for the wall 104, and 108 for the wall 105. As shown in FIGURE 3, the four corners of the rectangle formed by the four vertical walls are cut off at 109, 110, 111 and 112.

Inside the tank there is provided heat insulation. Specifically, the base sheet 101 is covered with a certain thickness of heat insulating material 113, the short walls are covered with a layer 115 and the joint between the layers 113 and 115 is reinforced at 114. The long wall is likewise covered with a heat insulating layer 117, and the joint between the layers 113 and 117 is reinforced at 116. The cut-off corners 109 to 112 also contain reinforced heat insulating material.

Brasquing is effected by any known method. The figures show cathodic iron bars 118 onto which drawn or pressed carbon blocks 119 are cemented. The gaps between the blocks themselves and between the blocks and the heat insulating material are filled with paste having a carbon base.

The anodes 120 are suspended from anode rods 121, themselves fixed to the device 200 for suspending the anodes. This device comprises two frames 210 and 220, each anode rod being connected by a special clamp 230 to each of the frames. The device will be described in greater detail later.

The anode system is connected to the cathode of the preceding bath 10 and the cathode system is connected to the anode of the following bath 20 by two systems of conductors 130 and 140, of which the first is one-quarter and the second three-quarters of the way along the length of the large side of the bath.

The system 130 is made up of a connection comprising the two bars 131 and 132, of which the one 132 extending from the movable frame 220 is directly connected to the end 12 of the cathode irons 11 of the bath 10. The end 12 is the end nearest the bath 100. The other bar 131, extending from the fixed frame 210, is connected to a bar 13 passing below the bath 10, and meeting the other end (not shown) of the irons 11. Similarly, the end 133 of the irons 118 of the bath 100 is directly connected to the bar 22 terminating in the movable frame of the following bath 20. The end 134 is connected to the bar 21 terminating in the fixed frame of the bath 20, by means of horizontal bars 135 passing below the bath 100. The cross section of the various bars is maintained so as to distribute the current evenly between the two frames. The flexible bar or "leaf-bar" 136, is made up of sheets of metal placed against one another, enables the bath 100 to be short circuited in case of need. In this case the insulating disc 137 which is normally placed between 136 and the bars 131 and 132 would be removed.

The system of conductors 140 (not shown) is identical with the system 130 just described.

The hood 150 comprises a fixed portion 151 and four portions which are inclined and movable about a shaft, namely. The portions 152 and 153 located along the large side of the bath are rotatable about the shafts 156 and 157. The portions 154 and 155 located along the small side of the bath are rotatable about the shafts 158 and 159. These movable panels are shown with longitudinal hatching when in the closed position and without hatching and with finer lines when in the open position.

In order to reduce heat losses to a minimum if the side panels are opened, the panels are preferably in the form of imperviously joined segments.

The panels or caps have a polished reflecting surface directed inwardly and a matt surface directed outwardly, the gap being filled with any heat-resistant insulating material such as glass wool or asbestos fibre. Very good results have been obtained using a panel 5 centimeters thick made up of two sheets of aluminum separated by at least one but preferably seven layers of crimped aluminum paper. The surface of the inner sheet facing the bath is glossed so as to give it a reflecting power of nearly 1, whereas the outer sheet has a matt surface. Alternatively, the polished surface can be dispensed with, and the caps used can be made up of two sheets of metal separated by a layer of heat insulating material.

Figure 4:
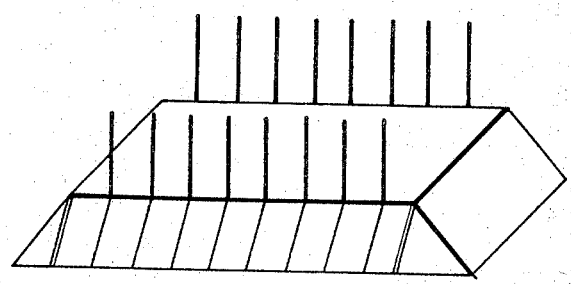
FIGURE 4 is a diagrammatic perspective view of the cell when operating.
Figure 5:
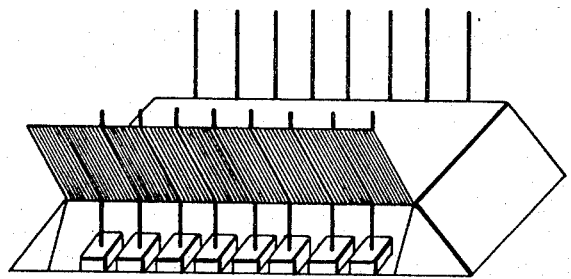
FIGURE 5 is a diagrammatic perspective view of the cell with one side open.
Figure 6:
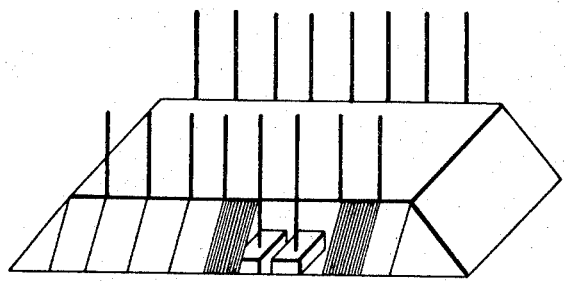
FIGURE 6 is a diagrammatic perspective view of the cell as it appears during changing of an anode.
Figure 7:
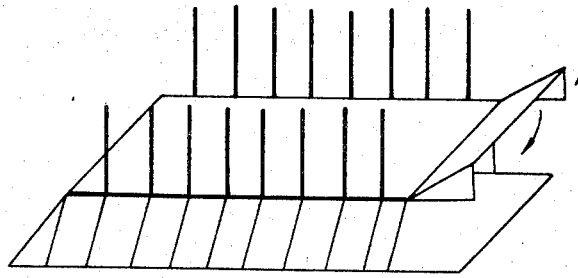
FIGURE 7 is a diagrammatic perspective view of the cell as it appears during an unpacking operation.
Figure 8:
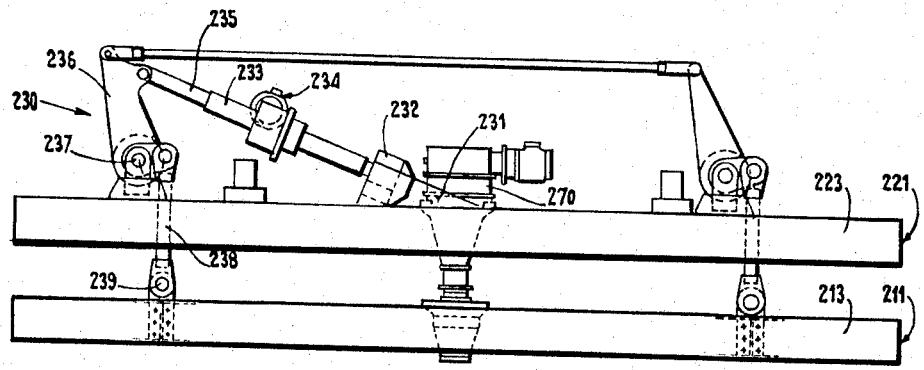
FIGURE 8 is an elevational view illustrating the anode suspension apparatus.

The shafts 156 to 159 about which the caps rotate may be located either at the four edges of the fixed horizontal panel 151 or at any other place enabling the operation illustrated in FIGURES 4 to 7 to be carried out. These operations are as follows:

Normal operation of the bath with the caps closed (FIGURE 4);

The opening of a large side of the bath (FIGURE 5);

The changing of an anode (FIGURE 6);

Unpacking from the side (FIGURE 7).

Figure 2:
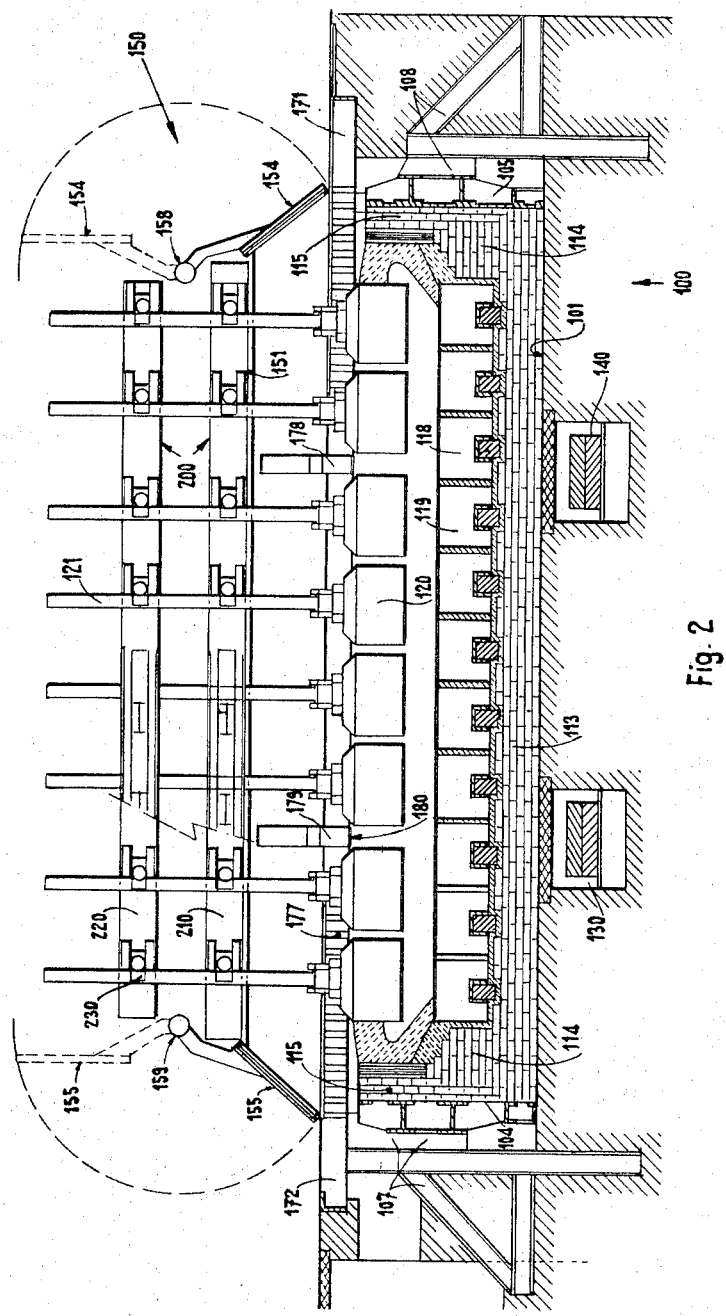
FIGURE 2 is a longitudinal cross-sectional view through the cell of FIGURE 1.

More particularly, the shafts 156 to 159 may be located between the fixed frame 210 and the movable frame 220 to the rear of the anode rods 121, as shown in FIGURES 1 and 2.

The bath is thus hooded and made virtually impervious, the only opening through which gas might escape being those made in the horizontal cap 151 for the passage of the rods of the anode supports 121. A slight depression is, therefore, formed inside the bath by sucking up a volume of gas very slightly greater than that of the gases normally produced. In this way only a minimum volume of air is sucked in in addition to the gases, resulting in a very slight heat loss but enabling concentrated gases to be collected, thus facilitating recovery of materials containing fluorine. If the anodic effect is present, the discharge may be considerably increased, so as to enable the increased volume of freed gases to be absorbed and to be drawn off at a speed such that the thin jets of gas are not deflected at right angles to the open cap so as to "unpack" the bath.

However, it is important that the flues used for conveying the gas be of large cross section and have only negligible load losses. For this purpose the corner flags 171 and 172 are hollow and are connected to ducts 176. The large discharge corresponding to the unpacking of the bath passes through these flags. The opening of one of the two small caps at the top starts a fan or opens a flap communicating with a large suction duct, common to a plurality of baths.

The girders supporting the whole superstructure are hollow and contain a pipe, which emerges from the bath, passing into the flag 173 and joins a low-discharge ventilation circuit, the latter being permanently in operation.

The anode suspension device 200 essentially comprises a substantially horizontal fixed frame 210 which is rigidly connected to, but electrically insulated from the bath, and a movable frame 220 which is also substantially horizontal. The shape of the external face of the frames depends on that of the bath. In the present case the bath is rectangular and the cut-off corners 109 to 112 can be disregarded. The frames are therefore also rectangular. Their large sides, comprising the lengths 211 and 212 on the one hand and 221 and 222 on the other hand, are covered with bars made of a material which is a good conductor of electricity, for example an aluminum alloy, these bars being numbered 213 for 211, 214 for 212, 223 and 221 and 224 for 222. The vertical external faces of the bars 213 and 223 on the one hand and 214 and 224 on the other hand are located in the same vertical plane.

The mechanism 230 for displacing the movable frame 220 in vertical translation relatively to the fixed frame 210 is fixed on the former frame. The frame 220 carries a bracket 231 to which is fixed a knee joint 232 carrying the mechanical screw jack 233, which is actuated by the electric motor 234 through a friction torque limiter. The rod 235 of the jack acts on the double lever 236 hinged onto the shaft 237 rigidly connected to the movable frame. The lever 236 acts on the rod 238 hinged at 239 to the fixed frame. The mechanism is preferably double, the other portion, similar to that just described being connected to and acted on by the latter through a rod which in this case is horizontal.

As the point 239 is fixed, the whole of the upper frame together with the mechanism supported by it is displaced in a vertical translatory movement when the motor 234 acting on the jack 233 rocks the lever 236 about the shaft 237.

Figure 9:
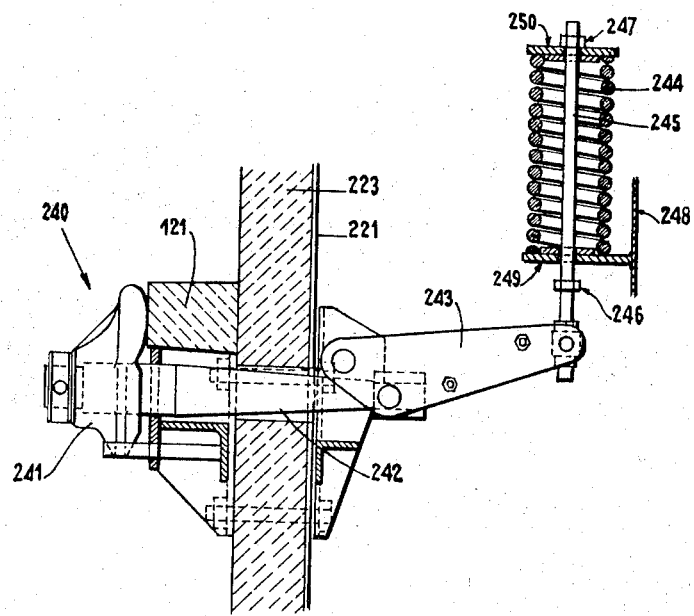
FIGURE 9 is a cross-sectional view illustrating an anode gripping clamp.
Figure 10:
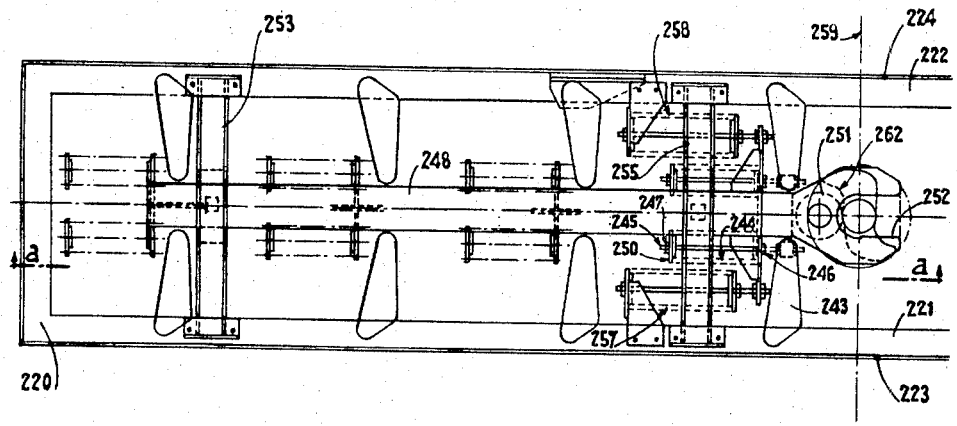
FIGURE 10 is a plan view of the upper frame structure.

The mechanism 240 (FIGURE 9) providing for the suspension proper of the anodes, comprises the gripping shoe 241, which forms one of the mouthpieces of the clamp in which the anode rod 121 is gripped, the other mouthpiece being formed by the side piece 221 of the frame, covered by the conductive bar 223 on its surface facing the rod. The shoe 241 is extended on a rod 242 about which it can pivot in the loosened position so as totally to free the space in front of the rod 121 if an anode is being changed. The rod 242 is acted on by the force-amplifying lever 243, which is in turn acted on by the control girder 248 by means of the biassed tightening spring 244. The spring is mounted on an axial bar 245, threaded at least at its two ends and between two plates, of which one 249 is rigidly connected to the girder 248 and the other 250 acts as an abutment for the spring. The extreme positions of the plate 249 can be adjusted by screwing and unscrewing nuts 246 and 247. The girder 248 is secured by the four slides 253 to 256 and returned by the action of the springs 257 to 258.

When the shoe is in the loosened position the plate 249 abuts the nut 246 and there is a free space between the shoe and the anode rod 121. When the shoe is to be tightened, a horizontally translatory movement parallel to the axis of the frame, i.e. to the side piece 221 and to the axial rod 245 is imparted to the girder 248. The plate 249 then moves the rod 245, the rod 245 acts on the lever 243, and the lever 243 moves the rod 242 and the shoe 241. The latter is thus displaced and comes into contact with the anode rod 121. From this time on, the unit formed by the shoe, the rod 242, the lever 243 and the bar 245 cannot be displaced without being resiliently deformed. The necessary force is transmitted by compression of the spring 244. This force, amplified by the lever 243, supplies the bearing force for the shoe on the anode rod. The plate 249 has moved out of contact with the nut 246.

In the loosening process the spring 244 is first released, the force of the shoe on the anode rod is consequently relaxed, and the plate 249 can move freely and abuts the nut 246 without the lever being moved. The plate then pushes back the nut 246 and, by means of the lever 243, the shoe is also displaced.

Figure 11:
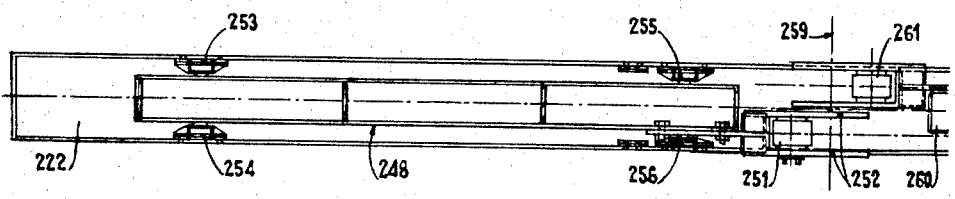
FIGURE 11 is a sectional view taken along the line $a-a$ of FIGURE 10.
Figure 12:
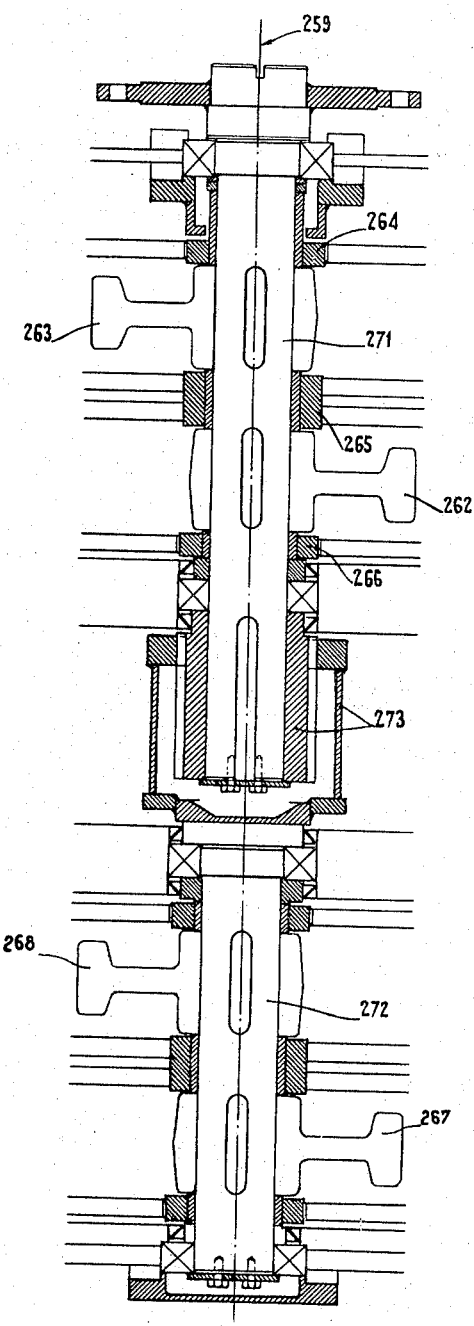
FIGURE 12 is a cross-sectional view of a vertical shaft and associated cam structure; and, FIGURE 13 is a diagrammatic view illustrating the various cam positions.
Figure 13:
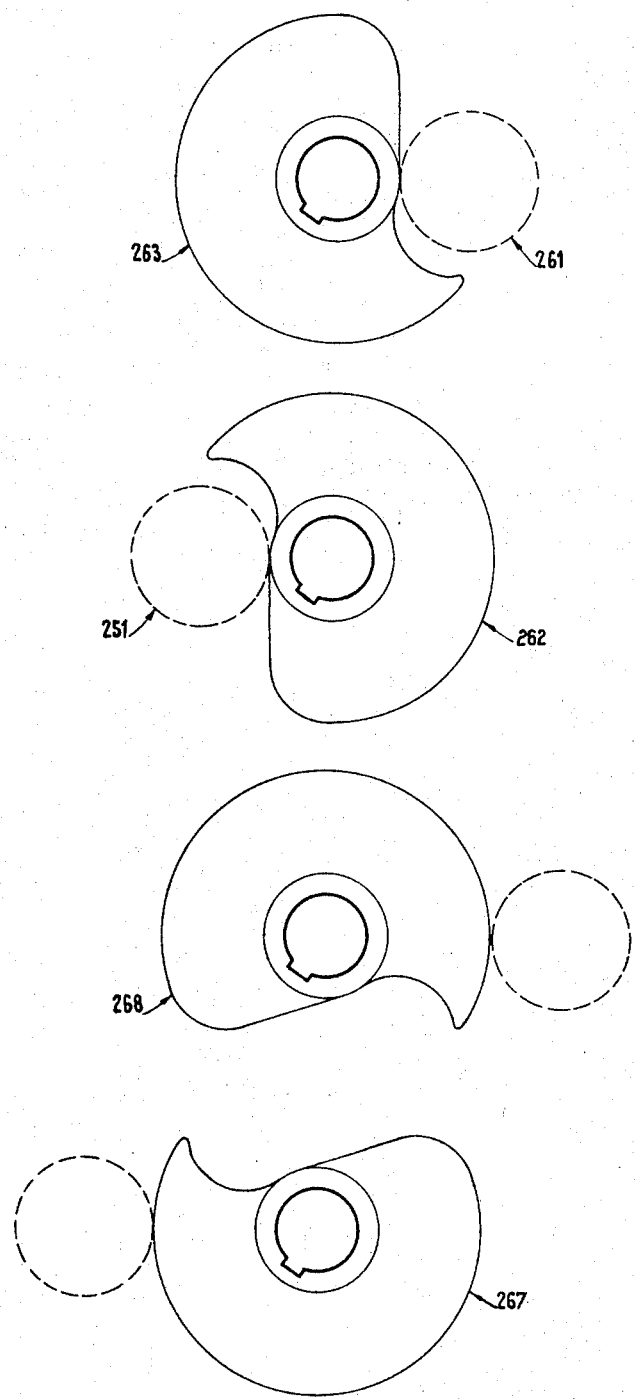

The translatory movement in the girder 248 is produced by the action of a cam 262 on a roller 251 carried at the end of the girder which also carries a double fork 252 for centering the girder on the vertical shaft 271 carrying the cam 262. The vertical shaft is at the center of the upper frame and there is a similar girder for each half-frame. Thus FIGURE 11 shows, to the left of the axis of symmetry 259 of the upper frame, the girder 248 serving the shoes at the left of the frame, and to the right of the axis 259, a similar girder 260 provided with its roller 261, serving the shoes at the right of the frame. The fixed frame 210 has the same number of shoes and the same mechanism as the movable frame 220 just described.

The four girders, two to each frame, are controlled by the same electric motor which, acting through a reducer and a torque limiter 270, actuates a vertical shaft of which the axis is identical with the axis symmetry 259 of the frames. The shaft has two portions, 271 controlling the clamps of the movable frame and 272 controlling the clamps of the fixed frame 210. The two portions are joined by a slide device 273 permitting a relative vertical translatory movement between them, although they continue to perform the same rotary movement about the axis 259. Each half-shaft comprises two cams offset from one another by 200° and preceded and followed by a cylindrical disc which enters the double forks at the end of the beams. Thus the half-shaft 271 joined to the movable frame carries the two cams 262 and 263 which respectively act on the rollers 251 and 261 carried by the ends of the girder 248 and 260. As the profiles of the two cams are identical but offset by half a revolution, the two girders will perform identical movements. All the clamps on the movable frame will open and close at the same time. The cylindrical discs 264, 265 and 266 are mounted respectively above the cam 263, between the two cams and below the cam 262. The double end fork 252 of the girder 248 confines the discs 265 and 264, the former being double length. The cams 267 and 268 exert an identical action on the rollers mounted at the ends of the girders actuating the clamps of the fixed frame, but the two cams are offset relatively to the cams relating to the upper frame by an angle of about 110°. Moreover, as the majority of the cams have a circular profile corresponding to the closed position of the clamps, it is clear that the clamps will remain closed for well over half a revolution of the shaft and that the clamps of at least one of the two shafts will be closed and blocked at any moment.

The apparatus is completed by a sequence distributor which feeds the motors 234 and 270 to relate the movement of the frames with the movement of the clamps, so that the two movements are combined as follows:

(a) To adjust the interpolar distance, which necessitates lowering the anodes a few millimeters to compensate for their wear;

Loosening the clamps of the fixed frame;
Lowering the movable frame with the movement of the clamps stopped;
Tightening the clamps of the fixed frame.

(b) When the movable frame has reached its lowest point it has to be raised to a high position, which involves the following operations:

Loosening the clamps of the movable frame;
Raising the movable frame with the clamps on the fixed frame still tightened;
Tightening the clamps of the movable frame.

The movable frame is usually raised every four or five days.

If for any reason such as the coagulation of an anode one of the anode rods 121 cannot follow the descending movement, a fourth limiter interrupts the descending movement before the rod slides into the corresponding clamp. The function of the two frames can obviously be reversed, the upper frame being fixed and the lower frame movable.

The bath according to the invention brings an enormous reduction in the losses of heat to the outside. Thus, as the temperature of the bath must not be varied, it is important to reduce the amount of heat freed by the electric current through the liquor. This can be done only by increasing the total surface of the anodic and cathodic planes.

A group of four baths with preheated anodes according to the invention has been formed. The baths, of 75 to 80 ka. have an anodic surface of 121,000 square centimeters, representing a current density of 0.66 ampere per square centimeter for 80 ka. The ratio of length to width was 1:8. The usual heat insulation in the form of a layer of bricks was reinforced with two additional layers, one of very great insulating power. The four corners are cut off as in FIGURE 3 by a reinforcement of the heat insulation. The bath is made undeformable by buttresses, two for each large side and one for each small side.

Any heated electrolytic bath using at least one of the means described above or at least one equivalent means is covered by the invention. It will be understood that various changes and modifications may be made in the above described invention which provide the characteristics of this invention without departing from the spirit thereof particularly as defined in the following claims.

That which is claimed is:

1. An electrolytic fusion construction comprising a plurality of cells arranged in series with the cathode of a preceding cell connected to the anode of a succeeding cell, each of said cells including a hood having heat reflecting material disposed on its interior surface and having heat insulating material disposed on its exterior surface, said hood comprising a fixed horizontal central portion and four inclined portions extending to the side walls of said cell, said inclined portions being rotatable about horizontal axes whereby each of said portions is adapted to be opened to permit access to the interior of said cell.

2. A cell according to claim 1 wherein the two inclined portions of the hood which are placed lengthwise are adapted to rotate about a common horizontal shaft located in the longitudinal axial plane of the cell, and the two inclined portions which are placed widthwise are adapted to rotate about a horizontal shaft located in the transverse axial plane of the cell.

3. A cell according to claim 1 wherein the hood comprises two sheets of aluminum separated by at least one layer of crimped aluminum, the surface of the inner sheet facing the bath being glossed so as to give it a reflection factor of nearly one, whereas the outer sheet has a matt external surface.

4. A construction in accordance with claim 1 including means for suspending the anodes in each of said cells, said suspending means comprising a movable frame and a fixed frame vertically disposed with respect to said movable frame, each of said frames being located above the hood structure, support means for each of said anodes, means for clamping each of said support means to both of said frames, means for vertically moving the movable frame relative to the fixed frame, and means for selectively releasing the clamping means during movement of the movable frame whereby the position of said anode supports relative to the frames, and accordingly the position of the associated anodes in said cell can be changed.

5. A construction in accordance with claim 1 wherein each of said cells is substantially rectangular in shape, and wherein heat insulating material is formed around each of the four sides of each cell, electrical conductors interconnecting the cathode of each preceding cell in series with the anode of each succeeding cell, each conductor including a first conductive bar connected to the nearest end of the cathode of the preceding cell, and a second bar extending from the remotest end of the cathode of the preceding cell to a point underneath the succeeding cell to thereby avoid agitation of metal due to the action of magnetic fields, and including a gas capturing device comprising gas conduits defined within the insulating material surrounding the cells, the conduits communicating at one end with the interior of the cells and having at their opposite end fan means capable of extracting gas from the interior of the cells, and wherein the total surface of the anodic plane of the anodes in a cell is such that heat released by the passage of electric current is equal to the amount of heat lost to the exterior of the cell.

6. In an electrolytic fusion cell, the improvement comprising a device for suspending the anodes of the cell comprising a substantially horizontal fixed frame connected to said cell and insulated therefrom, at least one electrically conductive bar secured to said fixed frame, a substantially horizontal movable frame electrically connected to the fixed frame and having at least one electrically conductive bar secured thereto, means for moving the movable frame vertically relative to said fixed frame, clamp means for suspending said anodes, said clamp means serving as means for electrically connecting said anodes to the conductive bars of the respective frames, said clamp means comprising a gripping means whereby each anode is adapted to be gripped by a clamp means on each frame, means for selectively releasing the clamp means on the respective frames, said releasing means being adapted to release the clamps of one frame whereby movement of the movable frame can vary the position of the anodes with respect to this one frame, and said releasing means being adapted to release the clamps on the other frame whereby said anodes can be moved with respect to this other frame.

7. A device in accordance with claim 6 including a hood structure disposed beneath said fixed frame, said hood structure defining side walls covering the area immediately above said cell, said hood structure including an inner heat reflecting surface and an outer layer of heat insulating material, and means for opening the side walls of said hood structure for communicating with the interior of said cell.

8. A cell in accordance with claim 6 wherein each of said clamp means comprises a gripping shoe, each of said anodes being engaged between a gripping shoe and a conductive bar, and spring means connected to each gripping shoe for normally pressing each shoe against the anode engaged thereby, and wherein each anode is engaged by a clamp associated with each of said frames, and wherein said releasing means for said clamps comprises a motor-reducer group, a cam shaft driven by said group, clamp girders mounted on each of said frames adapted to force said shoes out of engagement with said anodes, the cams on said cam shaft being operatively connected to said girders whereby operation of said motor-reducer group serves to simultaneously release the clamps connected to a particular girder, and wherein the cams operating on the girders of one frame are offset relative to the cams operating on the other frame so that said anodes are held by at least one clamp in any position of said releasing means.

9. A cell according to claim 8 wherein said motor-reducer group consists of two electric motors, one of said motors operating to move said movable frame, and the other of said motors operating the clamping and releasing means, and including a sequence distributor associated with said motors for automatically co-ordinating the movements thereof.

10. A cell in accordance with claim 9 wherein the motor employed for imparting movement to the movable frame actuates a system of levers which transform the rotary movement of the motor into vertical translatory movement of the movable frame.

References Cited
UNITED STATES PATENTS

| | | | |
|---|---|---|---|
| 2,761,830 | 9/1956 | Kibby | 204—244 |
| 2,930,746 | 3/1960 | Cooper | 204—244 |
| 2,958,635 | 11/1960 | DeNora | 204—243 |
| 3,235,478 | 2/1966 | Mantovanello et al. | 204—243 |
| 3,245,898 | 4/1966 | Wunderli | 204—243 |

ROBERT K. MIHALEK, *Primary Examiner.*

JOHN H. MACK, *Examiner.*

E. ZAGARELLA, *Assistant Examiner.*